United States Patent [19]

Grabner

[11] Patent Number: 5,322,114

[45] Date of Patent: Jun. 21, 1994

[54] METHOD AND DEVICE FOR LIMITING THE TEMPERATURE OF A BODY

[75] Inventor: Werner Grabner, Vienna, Austria

[73] Assignee: Grabner Instruments Messtechnik GesmgH, Austria

[21] Appl. No.: 972,137

[22] Filed: Nov. 5, 1992

[30] Foreign Application Priority Data

Nov. 5, 1991 [AT] Austria .................................. 2188/91

[51] Int. Cl.$^5$ .............................................. F28F 27/00
[52] U.S. Cl. .......................................... 165/32; 165/96
[58] Field of Search ...................................... 165/32, 96

[56] References Cited

U.S. PATENT DOCUMENTS 3,018,087  1/1962  Steele ...................................... 165/32

FOREIGN PATENT DOCUMENTS 204991   12/1983  Fed. Rep. of Germany ........ 165/32
620789    8/1978  U.S.S.R. .................................. 165/96
805043    2/1981  U.S.S.R. .................................. 165/32
1073553   2/1984  U.S.S.R. .................................. 165/96
1280405   7/1972  United Kingdom .................. 165/96

Primary Examiner—Albert W. Davis, Jr.
Attorney, Agent, or Firm—Steinberg, Raskin & Davidson

[57] ABSTRACT

An apparatus for limiting the temperature of a body associated with a heating system in which the heat exchange between a first heated body comprising a part of the heating system and a second body, upon exceeding a particular temperature, is to be decreased. A chamber is built between the first heated body and the second body and filled with a liquid. The chamber is impermeably connected with a flexible equalization vessel. If the temperature of the first heated body or second body, or the temperature within the chamber, exceeds the boiling temperature of the filling liquid, the filling liquid vaporizes and condenses in the connected equalization vessel. In this manner, heat conduction through the liquid between the first heated body and the second body is substantially prevented or in any case is significantly less than in the case of the filled chamber. If the chamber temperature decreases below the boiling point of the liquid, the filling liquid flows back again into the chamber and restores the advantageous heat conduction.

11 Claims, 2 Drawing Sheets

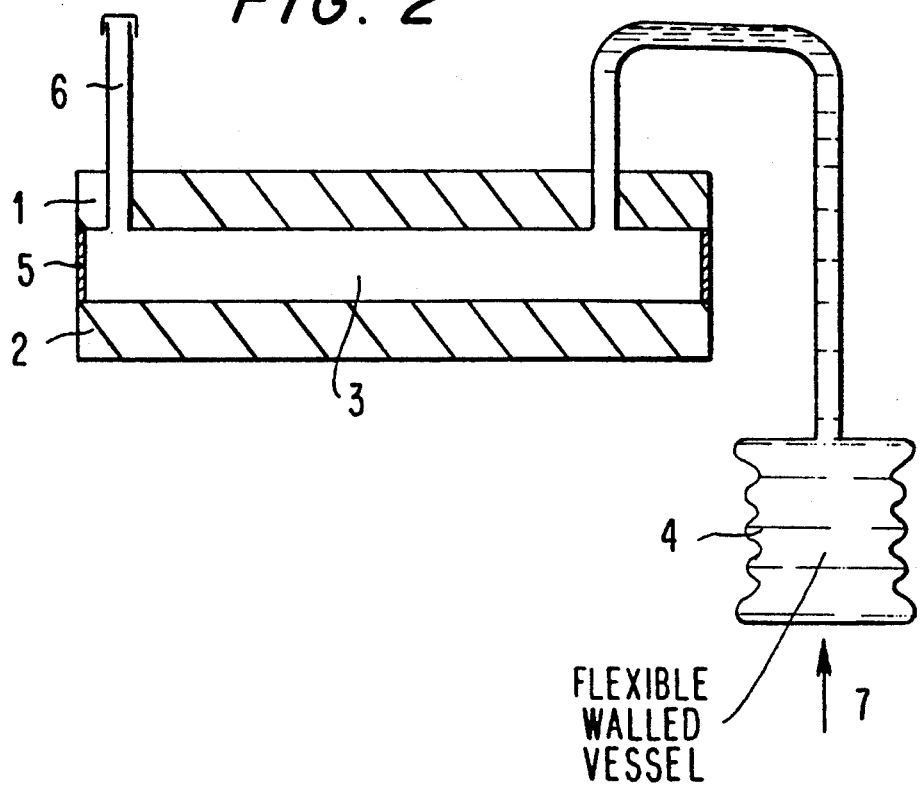
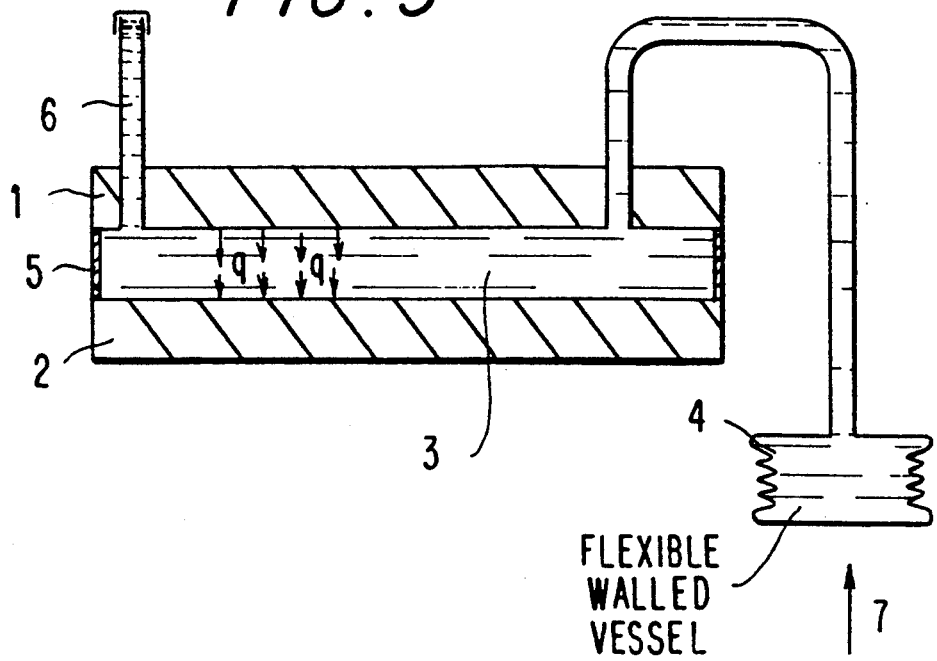

METHOD AND DEVICE FOR LIMITING THE TEMPERATURE OF A BODY

FIELD OF THE INVENTION

The invention relates to a method and a device for limiting the temperature of a body associated with a heating system where a chamber is provided between the heating system and the body. A liquid heat carrier is located inside the chamber.

BACKGROUND OF THE INVENTION

As is known in the art, thermal coupling for heating or cooling, in practice, takes place either through flowing media, such as air or liquid, through heat radiation, or through mechanical contact.

When using flowing media, the heat flow from a first body to a second body can be controlled by changing the quantity of flowing medium. However, to accomplish this purpose, a relatively expensive pump structure or thermosiphon structure is required. In addition, it is very difficult to control the high temperatures of the flowing medium through the structure.

The application of heat radiation is very limited as the low heat transport in the heat radiation procedure of thermal coupling functions only in the case of relatively high temperature differences. Moreover, a regulated control of the heat flow is very difficult to realize.

Mechanical contact leads to the lowest heat losses and devices based on mechanical contact are easily constructed. However, the disadvantage of a mechanical contact type of thermal coupling is the loss of the possibility of controlling the heat flow. This is because it is only possible to change the heat flow through a mechanical change of the contact.

A thermal coupling between two parts is very often necessary in which the maximum temperature of one of the two bodies is not to be exceeded, for instance in the construction of technical measuring instruments and apparatus, and also in industrial installations. The coupling can take place either through mechanical contact or through flowing media. In the case of mechanical contact, the problem of constant heat conduction exists even with high temperatures whereby one of the two parts involved in the coupling can be damaged due to its limited temperature stability. A decrease of the thermal contact is required in applications of this type when exceeding a given temperature limit. However, a decrease of the thermal contact is practically only possible through mechanical separation of the two connecting surfaces.

One application of such thermal coupling is the regulation of the temperature of a body. If this body is thermally well insulated, the regulation functions very well at high temperatures due to the heat radiation. If the body is to be rapidly cooled again, a good heat conduction to a cooling body is required. However, a permanent heat conduction to the cooling body would prevent heating to high temperatures.

Another example of an application of such thermal coupling where a maximum temperature limit cannot be exceeded is the use of thermoelectric elements, for instance Peltier elements, for heating and cooling of apparatuses and installation parts. Another possible application is for using these Peltier elements for the direct conversion of electrical energy from heat.

A significant disadvantage of commercially available Peltier elements is that the temperature range is limited at the high end. This high end limit is determined primarily through the usable alloys of the Peltier elements and through the soldering material used most often, soldering tin. Thus, the temperature range which can be reached with Peltier elements is limited to a maximum of about 250° C. Additional heating to a higher temperature leads to the destruction of the Peltier elements.

OBJECTS AND SUMMARY OF THE INVENTION

Accordingly, it is an object of the present invention to provide a new and improved method and apparatus for reducing the thermal contact between a heated body and an unheated body when the limit temperature has been exceeded.

Briefly, in accordance with the present invention, through the use of a "heat flow valve", it is possible to heat one of the two bodies to a high temperature without exceeding the temperature limit of the coupled body. In the event of falling below this limit temperature, the "valve" is automatically opened and the requisite thermal contact between the two bodies is re-established.

In one embodiment, a liquid heat carrier is vaporized upon reaching boiling temperature and displaced into the chamber of a cooled equalization vessel. The heat transmission through the chamber is reduced through the remaining vapor phase of the heat carrier. Preferably, the liquid heat carrier has a low heat of vaporization, such as alcohol. In addition, the boiling point of the liquid heat carrier is preferably below the maximum temperature of the part to be heated.

In another embodiment, the arrangement comprises condensing the developing vapor, during the vaporization of the liquid in the chamber, in the flexible equalization vessel, such that the excess pressure is reduced. The liquid heat carrier is pressed into the chamber during the cooling of the chamber by the atmospheric pressure acting upon the equalization vessel. In this manner, an advantageous heat transmission from the heating system to the cover is re-established.

BRIEF DESCRIPTION OF THE DRAWINGS

The following drawing is illustrative of an embodiment of the invention and is not meant to limit the scope of the invention as encompassed by the claims.

FIG. 2 is a schematic illustration of an embodiment of the present invention in which the equalization vessel is in an expanded state.

FIG. 3 is a schematic illustration of an embodiment of the present invention in which the equalization vessel is in a compressed state.

DETAILED DESCRIPTION OF THE INVENTION

Figure 1:
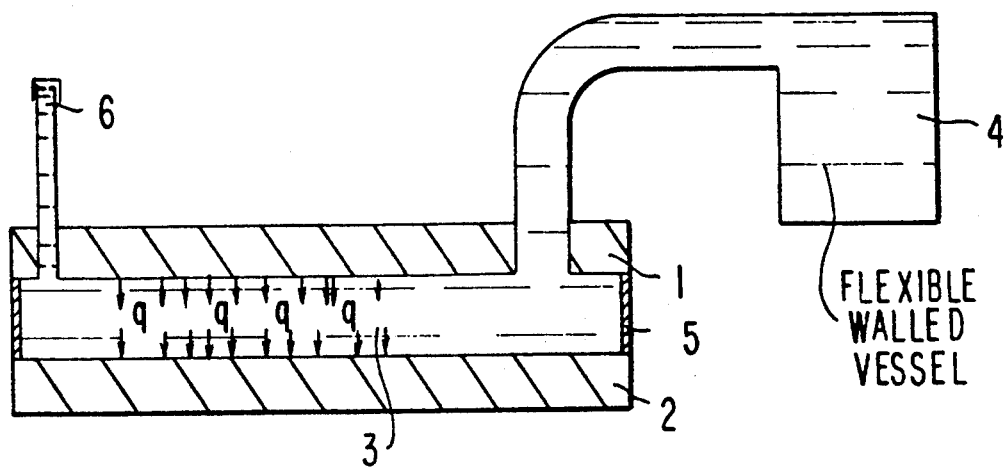
FIG. 1 is a schematic illustration of an apparatus according to the invention.

Referring to FIGS. 1, 2 and 3, a liquid chamber 3 is disposed between a first body 1 and a second body 2, which may comprise a cover of a heating system. The body 1 and body 2 each comprise a large-area heat-reflecting plate, and are placed at a short distance from each other. The chamber 3 is connected to an external equalization vessel 4 so that a completely closed system is formed. The chamber 3 is defined between inner surfaces of the two bodies and a boundary 5. The boundary, 5 is made from a material having a low heat conduction. A vent and fill pipe 6 is built in and extends into the liquid chamber 3. The equalization vessel 4 is disposed outside of the heated zone of room temperature and has a volume greater than the volume of the chamber 3. The equalization vessel 4 comprises an elastic material with good heat conductivity.

The chamber 3 and equalization vessel 4 are filled with a liquid through the vent and fill pipe 6 at room temperature and in the absence of air. In this manner, the chamber 3 and the equalization vessel 4 in the expanded state are completely filled. At low temperatures, a good thermal coupling is obtained due to heat conduction and heat transport through the movement of the liquid in the chamber 3 between the two bodies 1,2. If the temperature in the chamber 3 exceeds the boiling point of the filling liquid, the liquid will start to vaporize and condense in the adjoining equalization vessel 4 which is at room temperature.

The equalization vessel 4 is implemented so as to be flexible and so that the pressure in the system is only slightly above atmospheric pressure. The equalization vessel 4 can be cooled and its temperature regulated.

If the entire liquid in the chamber 3 has vaporized, only the heat conduction through the vapor and the side walls of the chamber 3 remains. In addition, heat radiation emanates from the heat-reflecting surfaces of bodies 1 and 2. The quantity of heat transported through this decreased heat conduction to the non-heated body 2 can be readily carried off so that the non-heated body does not reach its critical temperature. If the temperature in the chamber 3 decreases, the liquid in the equalization chamber flows back into the chamber until it is completely filled. The liquid flows, from the vessel 4 into the chamber 3 also as a result of means 7, which is, e.g., atmospheric pressure applied in the direction of the arrow. After filling the chamber 3, good thermal contact is re-established due to the heat conduction between the two bodies.

An important advantage of the present invention is the possibility of limiting the heat flow between two bodies whenever a temperature limit of one of the bodies is exceeded. The maximum heat flow is set without movable parts only through the dimensioning of the size of the body. The material composition of the body and other elements of the device will also affect the stability and use of the device as will be discussed later.

The limit temperature is determined by the properties of the filling liquid. It is also important to consider the boiling point of the liquid and the pressure used. A suitable liquid is, for example, alcohol, which even at relatively high temperatures does not break down.

The invention may be used, for example, for heating a body with Peltier elements and additional heating system units over a large temperature range. The Peltier elements are arranged on the side of the plate configuration opposite the body being heated. The additional heating units are arranged in the body being heated.

Regulation at low temperatures takes place via the Peltier elements, whereas regulation at high temperatures are achieved with the additional heating system. The required decrease of the heat conduction between the heating system and the Peltier elements at high temperatures takes place without movable parts but rather only through utilization of the physical properties of liquids. Temperature differences of more than 300° C. between the body 1 and cover 2 can be readily achieved through the device in accordance with the invention so that the entire achievable temperature range of the heating elements is considerably expanded. A significant expansion of the application range of Peltier elements is thereby provided.

In the direct conversion of electrical energy with Peltier elements, the subject matter of the invention can be applied in such a way that the hot side of the device is separated by the chamber 3 from the Peltier elements. Thus, temperatures higher than the limit temperature of the Peltier elements can be reached. The vapor density in the chamber 3 adjusts automatically depending on the electrical energy drawn and the heat flow resulting therefrom.

A similar application can also take place in process technology.

In another embodiment, a substance or a body can be heated through thermal coupling to a hot body. The heat flow can be limited by interconnecting a chamber according to the invention.

In the present invention, the two bodies are preferably plates fabricated of a material which is a good heat conductor. The surfaces of the two plates (body 1 and cover 2) within the chamber 3 is implemented to be heat-reflecting through suitable surface improvement or other heat-reflecting means.

The side walls 5 are preferably fabricated of very thin-walled special steel because of the latter's low heat conductivity. Other materials having a low heat conductivity might also be used. Preferably, the sealing of the chamber 3 takes place by soldering the two plates with the side walls. However, the plates can be connected to the side walls by other known methods.

The liquid preferably is selected as a substance with a low heat of vaporization and a boiling point markedly below the temperature critical for the sensitive part. For example, alcohol has a relatively low heat of vaporization and is extremely well suited to be used with Peltier elements since during the vaporization process a large amount of energy is not required.

The equalization vessel 4 is vapor-tight with respect to the liquid and comprises elastic walls. In an advantageous manner, a pocket-like container comprising a thin-walled synthetic material is used. In addition, a bellows-like container can also be used.

For filling of the system, for example with a specific filling liquid, a vent and fill pipe 6 is installed as a connection line to the interior of the chamber 3. The equalization vessel 4 is filled with the liquid through the vent and fill pipe 6 and connected to the chamber 3. By compressing the equalization vessel 4, the liquid is pressed into the chamber 3 and air escapes through the vent and fill pipe 6. Given a suitable orientation during the filling stage, the system can in this way be filled air-free. After the filling is completed, the vent and fill pipe 6 is closed off.

The examples provided above are not meant to be exclusive. Many other variations of the present invention would be obvious to those skilled in the art, and are contemplated to be within the scope of the appended claims.

I claim:

1. A method for limiting the temperature of a body associated with a heating system, comprising the steps of providing a chamber between a part of the heating system and the body, heat being transmitted through the chamber from the heating system to the body, placing a liquid heat carrier having a low heat of vaporization in the chamber, the liquid heat carrier being heated by the heating system and being vaporized into a vapor phase in the chamber upon reaching its boiling point, and displacing a portion of the vapor of the liquid heat carrier into a flexible and cooled equalization vessel exterior to the heating system to cause the equalization vessel to expand, whereby the heat transmission through the chamber is reduced through the low heat conductance of the vapor phase of the liquid heat carrier remaining in the chamber.

2. A method as claimed in claim 1, wherein the liquid heat carrier comprises alcohol.

3. A method as stated in claim 1, wherein the boiling point of the liquid heat carrier is below the maximum temperature of the body being heated.

4. A method as claimed in claim 1, wherein the vapor condenses in the equalization vessel such that excess pressure in the chamber is reduced.

5. The method of claim 4, wherein the equalization vessel increases in size when the portion of the vapor of the liquid heat carrier is displaced therein and decreases in size when the liquid heat carrier condenses and flows from the equalization vessel to the chamber.

6. A method as claimed in claim 1, further comprising the step of pressing the liquid heat carrier in the equalization vessel into the chamber as the chamber cools by the effect of atmospheric pressure acting upon the equalization vessel such that an advantageous heat transmission from the heating system to the body is re-established.

7. A device for limiting the temperature of a body associated with a heating system, comprising
a heating system comprising a first hot body,
a second body arranged at a distance from said first hot body,
a liquid chamber through which heat is transmitted from said first hot body to said second body, said liquid chamber having a boundary contacting said first hot body on one side and said second body on an opposite side,
a vent and fill pipe extending into said liquid chamber, a liquid having a low heat of vaporization flowing through said pipe into said liquid chamber, and
a flexible equalization vessel connected to said liquid chamber, the liquid in said liquid chamber being vaporized into a vapor phase and passed to said equalization vessel when the critical temperature of said second body or of said first hot body is reached to cause the equalization vessel to expand, whereby the heat transmission through said liquid chamber is reduced through the low heat conductance of the vapor phase of the liquid remaining in said liquid chamber.

8. A device as claimed in claim 7, wherein said boundary is a thin-walled structure.

9. A device as claimed in claim 7, wherein said boundary is comprised of a poor heat-conducting material, 10. The device of claim 7, wherein the vapor phase of the liquid heat carrier condenses in said equalization vessel thereby causing a decrease in size of said equalization vessel.

11. The device of claim 7, wherein said equalization vessel comprises a bellows-like container.

* * * * *